US008839045B2

(12) United States Patent
Alanis et al.

(10) Patent No.: US 8,839,045 B2
(45) Date of Patent: *Sep. 16, 2014

(54) DEBUGGING OF ADAPTERS WITH STATEFUL OFFLOAD CONNECTIONS

(71) Applicant: International Business Machines Corporation, Armonk, NY (US)

(72) Inventors: Francisco Jesus Alanis, Cedar Park, TX (US); Omar Cardona, Cedar Park, TX (US); Jeffrey Paul Messing, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,651

(22) Filed: Sep. 18, 2013

(65) Prior Publication Data
US 2014/0019808 A1    Jan. 16, 2014

Related U.S. Application Data

(63) Continuation of application No. 13/344,271, filed on Jan. 5, 2012.

(51) Int. Cl.
*G06F 11/00* (2006.01)
*G06F 11/07* (2006.01)
*G06F 11/22* (2006.01)
*H04L 12/24* (2006.01)

(52) U.S. Cl.
CPC .............. *G06F 11/079* (2013.01); *G06F 11/22* (2013.01); *H04L 41/069* (2013.01)
USPC ............................. 714/45; 714/38.11; 714/56

(58) Field of Classification Search
None
See application file for complete search history.

(56) References Cited

U.S. PATENT DOCUMENTS

| 6,105,150 | A  | * | 8/2000  | Noguchi et al. ............... 714/44 |
| 6,202,090 | B1 | * | 3/2001  | Simone ........................ 709/220 |
| 6,618,823 | B1 | * | 9/2003  | West ............................... 714/25 |
| 6,813,634 | B1 | * | 11/2004 | Ahmed ......................... 709/224 |
| 7,669,085 | B2 | * | 2/2010  | Alam et al. ..................... 714/43 |
| 7,831,720 | B1 |   | 11/2010 | Noureddine et al. ......... 709/227 |
| 7,962,628 | B2 |   | 6/2011  | Freimuth et al. ............. 370/235 |
| 8,010,506 | B2 | * | 8/2011  | Matsuda ....................... 707/682 |
| 8,392,695 | B1 | * | 3/2013  | Lachwani et al. ................ 713/2 |
| 2006/0112219 | A1 | * | 5/2006 | Chawla et al. ................ 711/114 |
| 2006/0251120 | A1 |   | 11/2006 | Arimilli et al. ............... 370/469 |
| 2008/0201616 | A1 | * | 8/2008 | Ashmore ........................ 714/57 |
| 2011/0078320 | A1 |   | 3/2011  | Grayson et al. ............... 709/228 |

OTHER PUBLICATIONS

"Generic Bus Debug and Test I/O Adapter," IBM Technical Disclosure Bulletin, International Business Machines Corporation, Nov. 1, 2002, 3 pages.

* cited by examiner

*Primary Examiner* — Gabriel Chu
(74) *Attorney, Agent, or Firm* — VanLeeuwen & VanLeeuwen; John D. Flynn

(57) ABSTRACT

An approach is provided in which a network hardware adapter stores offload information in a shared memory area that is located on a host system. The offload information includes connection information that was offloaded to the network hardware adapter by an application executing on the host system. An operating system (e.g., a network device driver) detects a network adapter error corresponding to the network hardware adapter and, in turn, retrieves the offload information stored in the shared memory area. As such, an analysis application utilizes the retrieved offload information to debug the network adapter error.

8 Claims, 9 Drawing Sheets

DEBUGGING OF ADAPTERS WITH STATEFUL OFFLOAD CONNECTIONS

BACKGROUND

The present disclosure relates to debugging network hardware adapters that support stateful offload connections. More particularly, the present disclosure relates to a network hardware adapter maintaining offload information in a shared system memory that is accessible by an operating system to debug network hardware adapter errors.

Modern communication adapters are increasingly moving to stateful offload technologies in order to improve network throughput performance and reduce host system processing loads. Typical offload technologies in use today include Remote Direct Memory Access (RDMA), RDMA over Converged Ethernet (RoCE), Internet Wide RDMA Protocol (iWARP), Infiniband (IB), and TCP Offload Engine (TOE). A common thread between stateful offload technologies is that the state for any given connection is based on the corresponding network adapter's context. The stateful information that represents the network adapter's context includes connection information and resource information (data structures) used by the network adapter to communicate with the operating system and corresponding applications (queue pairs, completion queues, registers, memory registrations, etc.).

BRIEF SUMMARY

According to one embodiment of the present disclosure, an approach is provided in which a network hardware adapter stores offload information in a shared system memory area located on a host system. The offload information includes connection information that was offloaded to the network hardware adapter by an application executing on the host system. An operating system (e.g., a network device driver) detects a network adapter error corresponding to the network hardware adapter and, in turn, retrieves the offload information stored in the shared memory area. As such, an analysis application utilizes the retrieved offload information to debug the network adapter error.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
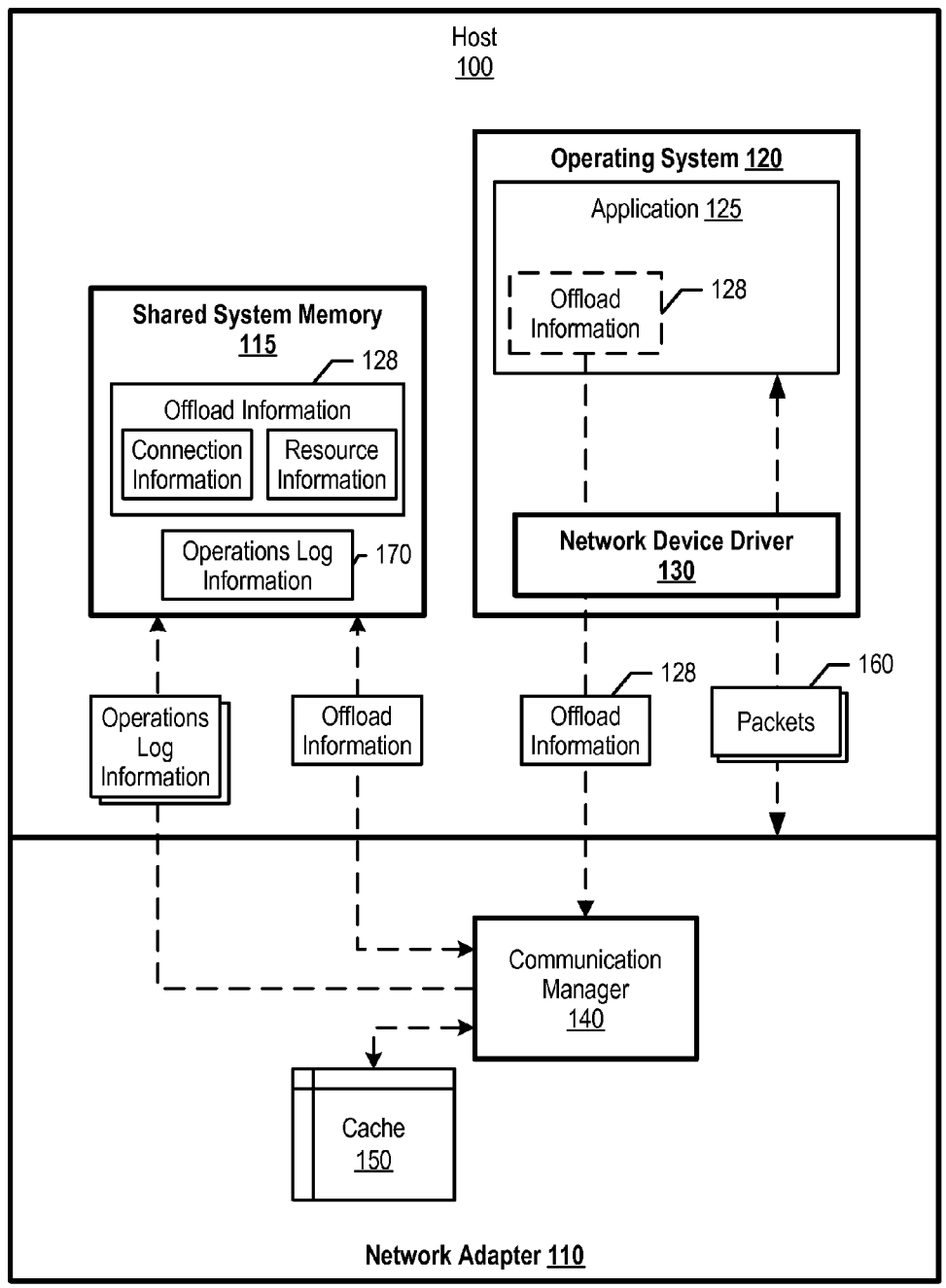
FIG. 1 is a high level diagram showing a network adapter maintaining offload information and operations log information in a shared memory area.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

An operating system provides a block of shared system memory to a network adapter for the network adapter to maintain offload data and operations log. In the event of an adapter failure (non-responsive), the operating system (via a network device driver) retrieves the offload information and operations log information from the shared memory provides the information to an analysis application in order to debug the network adapter failure FIG. 1 is a high level diagram showing a network adapter maintaining offload information and operations log information in a shared memory area. Host 100 includes operating system 120, which manages network device driver 130. Network device driver 130 is a software module that interfaces application 125 with network adapter 110 to send and receive data packets over a computer network.

In order to communicate using a stateful offload protocol (to improve performance), application 125 provides offload information 128 to network adapter 110 through network device driver 130. Prior to doing so, however, operating system 120 allocates shared system memory 115 to network adapter 110. As such, shared system memory 115 is accessible to network adapter 110 and operating system 120 (e.g., network device driver 130).

Offload information 128 includes connection information and resource information. The resource information includes resource identifiers and state information pertaining to resources utilized by application 125 to communicate with network adapter 110 (e.g., queue pair identifiers, completion queue identifiers, etc.). The resource information is utilized to interpret the stateful offload information and process egress/ingress data packets from/to application 125 (see FIG. 3A and corresponding text for further details). The connection information includes the state of connections between ports and buffer information (e.g., packets sent, acknowledgements, etc.) (see FIG. 3B and corresponding text for further details).

Network adapter 110 includes communication manager 140. Communication manager 140 manages resource information and connection information between shared system memory 115 and cache 150. In one embodiment, communication manager 140 may store a portion of the resource information in cache (currently active connections) and store a portion of the resource information in shared system memory 115 (e.g., memory intensive information).

Communications manager 140 also "mirrors" information updates in cache 150 to shared system memory 115. For example, if communication manager 140 updates queue pair identifiers in cache 150 for a particular application, communication manager 140 also updates the queue pair information in shared system memory 115 (see FIG. 6 and corresponding text for further details).

While network adapter 110 processes packets 160, communication manager 140 logs network adapter operations in shared system memory 115 (operations log information 170). Operations log information 170 may include information pertaining to operations performed on various resources/connections. As such, when network adapter 110 becomes non-responsive, operating system 120 may utilize offload information 128 and operations log information 170 for debugging purposes (see FIG. 2 and corresponding text for further details).

Figure 2:
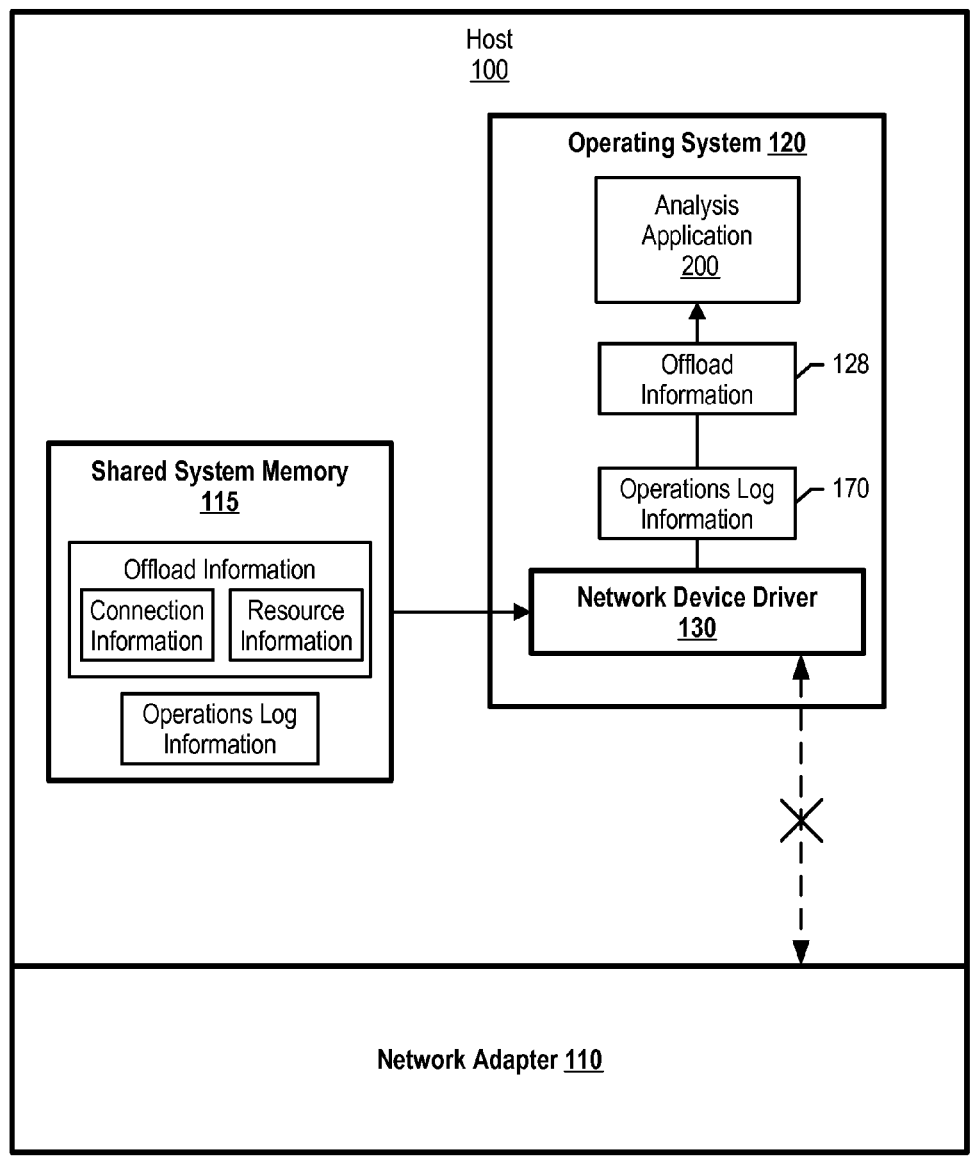
FIG. 2 is an exemplary diagram showing an operating system's network device driver retrieving information from a shared memory area after a network adapter error.

FIG. 2 is an exemplary diagram showing an operating system's network device driver retrieving information from a shared memory area after a network adapter error. While processing data packets, network device driver 130 may detect a communication failure with network adapter 110, such as when network adapter 110 is executing prototype code. When this occurs, network device driver 130 retrieves offload information 128 and operations log information 170 from shared system memory 115. Such information provides an accurate representation of the state of network adapter 110 because network adapter 110 was mirroring its cache and providing operations logs up to the point at which network adapter 110 became non-responsive (see FIG. 1 and corresponding text for further details).

Figure 7:
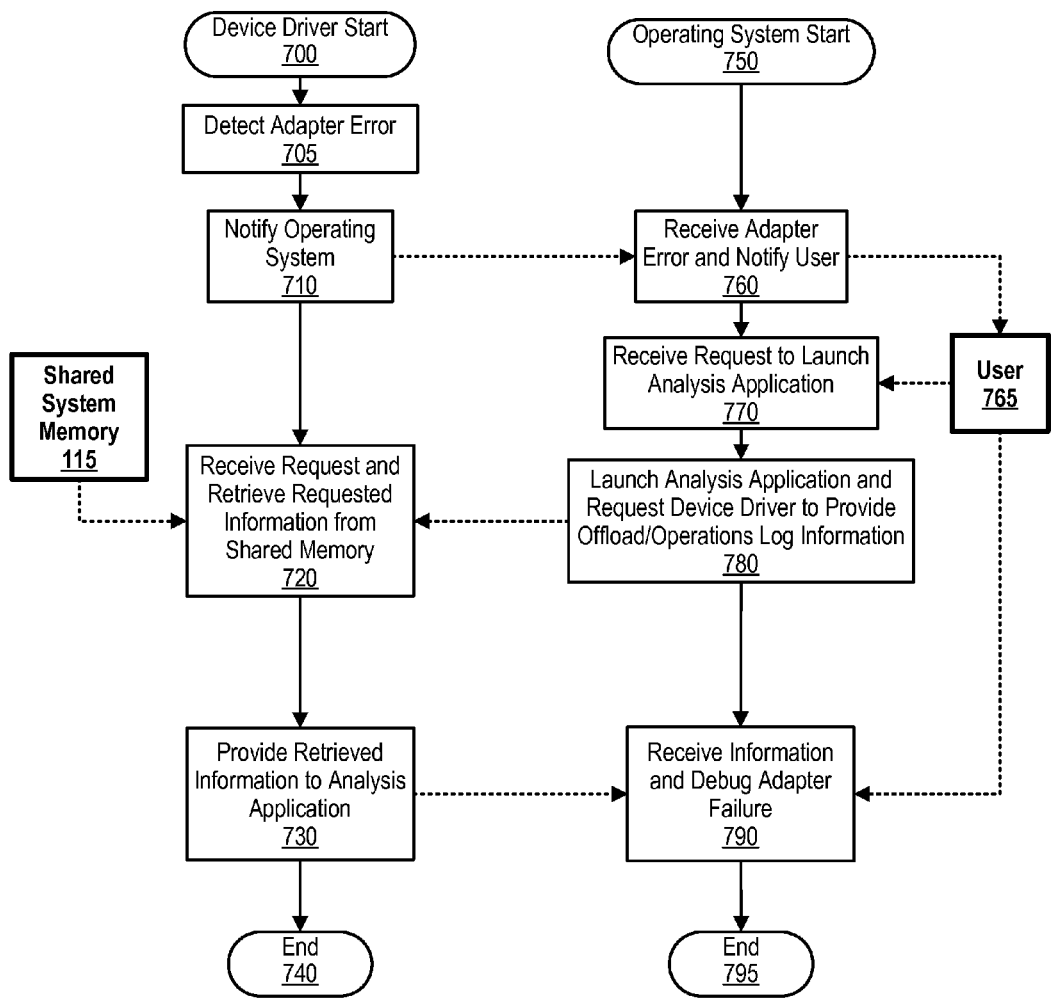
FIG. 7 is a flowchart showing steps taken in an analysis application debugging a network adapter failure utilizing offload data and operations log data; [PLEASE PROVIDE]

Network device driver 130 provides offload information 125 and operations log information 170 to analysis application 200, which proceeds through a series of steps to debug network adapter 110's reason for non-responsiveness (see FIG. 7 and corresponding text for further details).

Figure 3A:
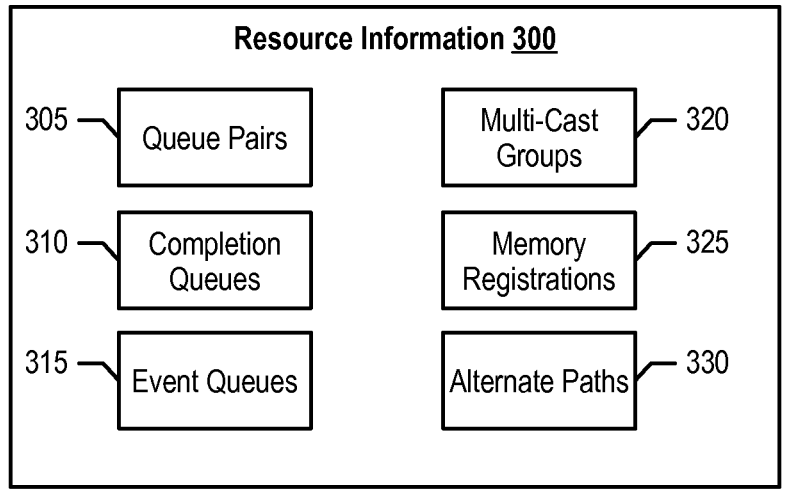
FIG. 3A is a diagram showing an embodiment of resource information that an application offloads to a hardware network adapter.

FIG. 3A is a diagram showing an embodiment of resource information that an application offloads to a hardware network adapter, which the network adapter stores in a shared system memory. An application sends resource information 300 (part of offload information 125) to a network adapter in order for the network adapter to provide a stateful offload connections to the application.

Resource information 300 includes information pertaining to resources utilized by the application to communicate with the network adapter. The example shown in FIG. 3A corresponds to an RDMA embodiment and includes queue pair information 305, completion queues information 310, event queues information 315, multi-cast groups information 320, memory registrations information 325, and alternate paths information 330. The information includes identifiers (e.g., queue pair number QP4) and their configuration properties. As those skilled in the art, other types of resource information may be offloaded to the network adapter, for example, based on a different offload protocol.

In one embodiment, the network adapter may store a portion of resource information 300 in cache and stores a portion of resource information 300 in shared system memory (memory intensive information). In this embodiment, the network adapter mirrors changes made to the cache-stored resource information onto the shared system memory (see FIG. 6 and corresponding text for further details).

Figure 3B:
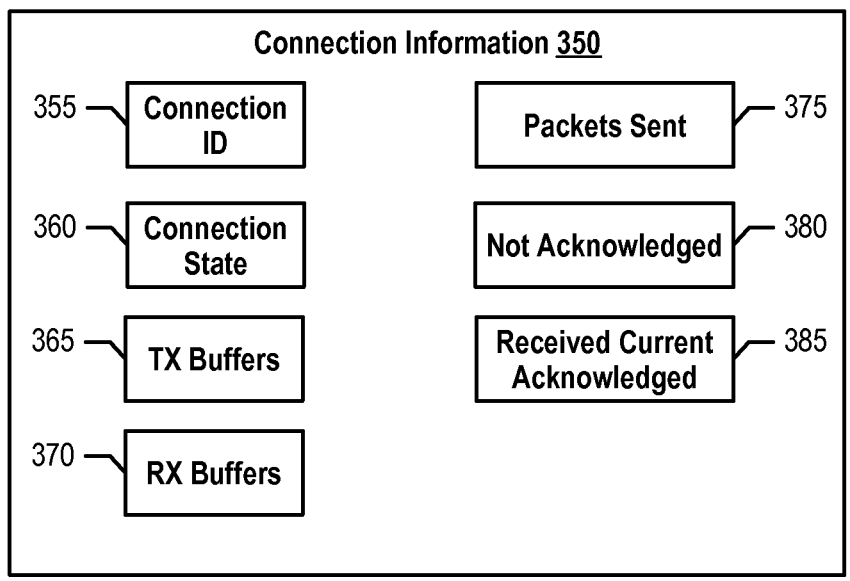
FIG. 3B is a diagram showing an embodiment of connection information that an application offloads to a hardware network adapter.

FIG. 3B is a diagram showing an embodiment of connection information that an application offloads to a hardware network adapter. Similar to resource information 300 discussed above, the application sends connection information 350 (part of offload information 125) to a network adapter in order for the network adapter to provide a stateful offload connections to the application.

Connection information 350 includes information pertaining to connections between a port utilized by the application and a destination port. The example shown in FIG. 3B shows connection information that includes connection identifiers 355, connection states 360 (in progress, active, inactive, etc.), posted transmit buffers 365, posted receive buffers 370, packets sent 375, packets not acknowledged 380, and received data acknowledgements 385. In one embodiment, connection state 360 typically tracks a state machine and varies by protocol. For example connection state 360 may include an "INIT" state, a "Connecting" state, a "Ready to Receive" state, a "Ready to Send" state, an "Error" state, or a "Closing" state. In this example, TX buffers 365 and RX Buffers 370 may be tied to queue pair structures 305, along with Packets Sent 375/Not Acknowledged 380.

The network adapter updates the connection information in the cache/shared system memory during operation. As such, when a network adapter becomes non-responsive, an analysis application is able to identify the connection states and configuration parameters utilized by the network adapter prior to failure.

Figure 4:
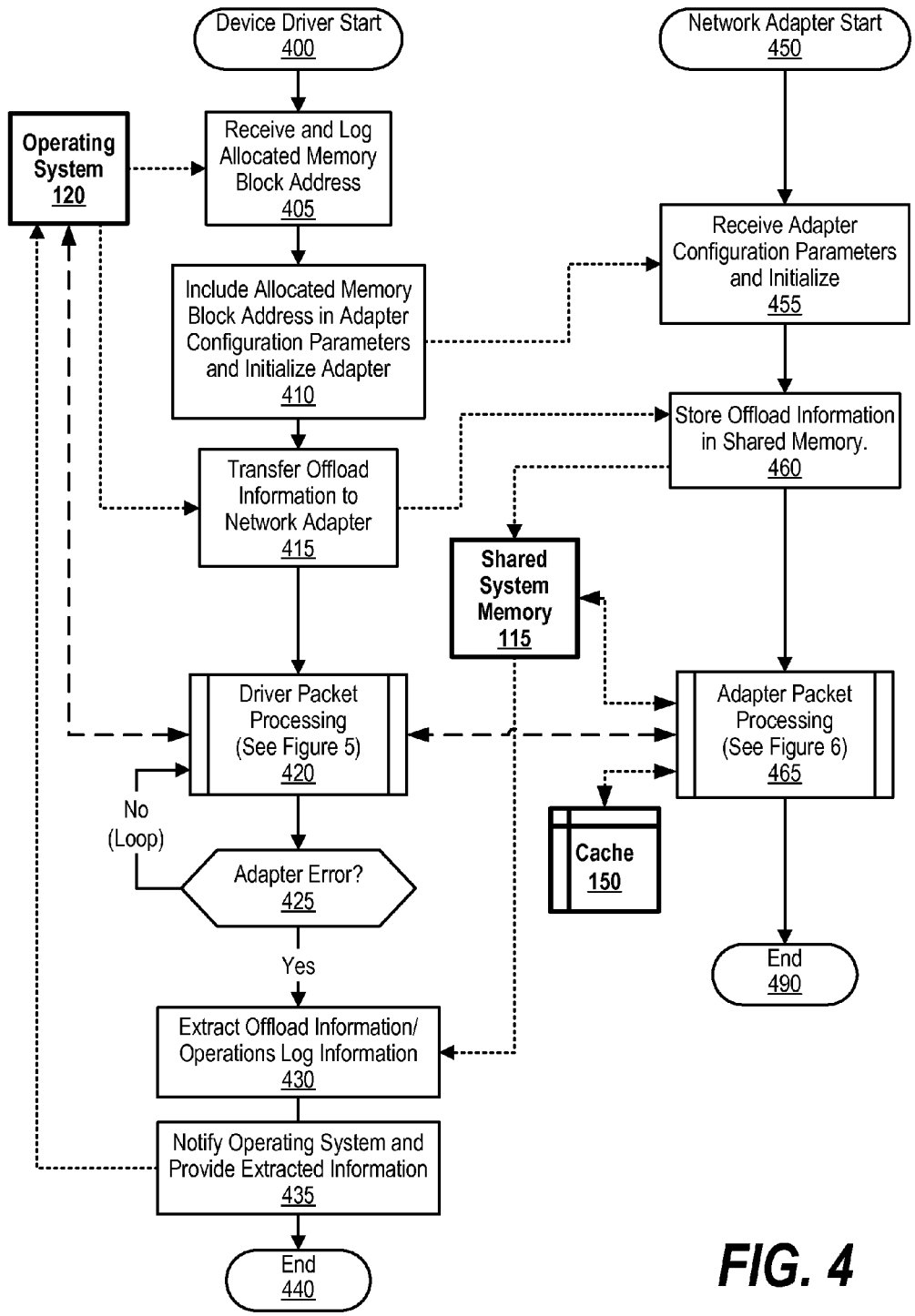
FIG. 4 is a high-level flowchart showing steps taken in a network device driver monitoring network adapter responsiveness.

FIG. 4 is a high-level flowchart showing steps taken in a network device driver monitoring network adapter responsiveness. Device driver processing commences at 400, whereupon the device driver receives a memory block address from operating system 120 that identifies a system memory area to share with the network adapter (step 405).

At step 410, the device driver includes the memory block address in configuration parameters that it sends to the network adapter during initialization (step 410). Network adapter processing commences at 450, whereupon the network adapter receives the configuration parameters, which includes the shared memory block address (step 455).

Referring back to the device driver, at step 415, the device driver receives offload information from an application executing in operating system 120 and sends the offload information to the network adapter. The network adapter, at step 460, stores the offload information in shared memory 115. In one embodiment, the network adapter may store some or all of the offload information in its cache (cache 150) in preparation for supporting an active communication session for the application.

Once the network adapter configuration completes, the device driver and network adapter begin to process egress/ingress data packets from/to the application executing on operating system 120. During this time, the network adapter updates resource information and connection information between shared memory 115 and cache 150. In addition, the network adapter stores operations log information in shared memory 115 (pre-defined process block 465, see FIG. 6 and corresponding text for further details).

Figure 5:
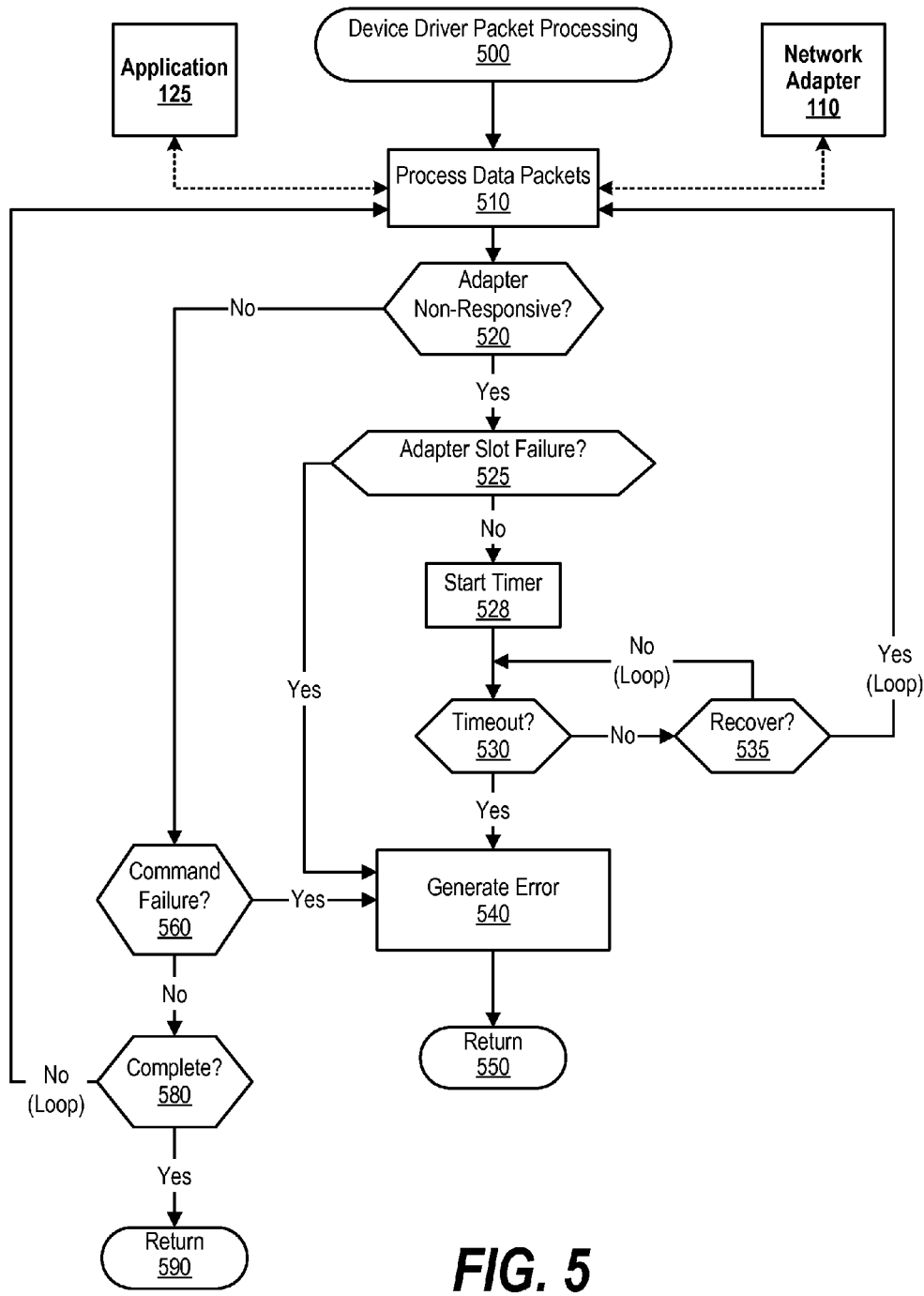
FIG. 5 is a flowchart showing steps taken in a device driver processing data packets and monitoring network adapter communication.

The network device driver monitors communication (decision 420) between the network adapter and reports an adapter error when the network adapter is not functioning properly (e.g., non-responsiveness, command failures, etc., pre-defined process block 420, see FIG. 5 and corresponding text for further details). As long as the network adapter functions properly, decision 425 branches to the "No" branch, which loops back to continue to process packets and monitor network adapter communication.

In time, the network device driver detects an adapter error and decision 420 branches to the "Yes" branch. At step 430, the device driver extracts offload information and operations log information from shared memory 115. In turn, at step 435, the device driver notifies operating system 120 and provides the extracted information to an analysis application executing on operation system 120 (see FIGS. 2, 7, and corresponding text for further details). Device driver and network adapter processing end at 440 and 490, respectively.

FIG. 5 is a flowchart showing steps taken in a device driver processing data packets and monitoring network adapter communication. Processing commences at 500, whereupon the device driver forwards data packets between application 125 and network adapter 110 at step 510. While the device driver processes packets or, in one embodiment, during idle times, the device driver determines whether the network adapter is non-responsive (decision 520). For example, a user may be testing new code on the network adapter and the new code may have a bug that suspends the network adapter.

If the network adapter is non-responsive, decision 520 branches to the "Yes" branch, whereupon a determination is made as to whether there is an adapter slot failure, such as when the slot doesn't respond or information is all set to the same value (e.g., −1) (decision 525). If there is an adapter slot failure, decision 525 branches to the "Yes" branch, whereupon the device driver generates an error at step 540.

On the other hand, if there is not an adapter slot failure, decision 525 branches to the "No" branch, whereupon the device driver starts a countdown timer at 528 (e.g., to provide the network adapter time to respond). A determination is made whether the timer timed out (decision 530). If the timer has not timed out, decision 530 branches to the "No" branch, whereupon a determination is made as to whether the network adapter has recovered (decision 535). If the network adapter recovered, decision 535 branches to the "Yes" branch, which loops back to process more data packets. On the other hand, if the network adapter has not recovered, decision 535 branches to the "No" branch, which loops back to wait for either the timer to time out or the network adapter to recover. If the timer times out, decision 530 branches to the "Yes" branch, whereupon the device driver generates an adapter error and returns at 550.

Referring back to decision 520, if the adapter is responsive, decision 520 branches to the "No" branch, whereupon the device driver determines whether there is a command failure (decision 560). For example, in response to packets, the driver might be adding a multicast address that has various possible results, one of which being a command failure. If there is a command failure, decision 560 branches to the "Yes" branch, whereupon the device driver generates an adapter error at step 540.

On the other hand, if there is not a command failure, decision 560 branches to the "No" branch, whereupon a determination is made as to whether the application and device driver are finished processing data packets (decision 580). If they are not finished, decision 580 branches to the "No" branch, whereupon the device driver continues to process data packets. This looping continues until they are finished processing data packets (e.g., system shutdown), at which point decision 580 branches to the "Yes" branch, whereupon device driver processing returns at 590.

Figure 6:
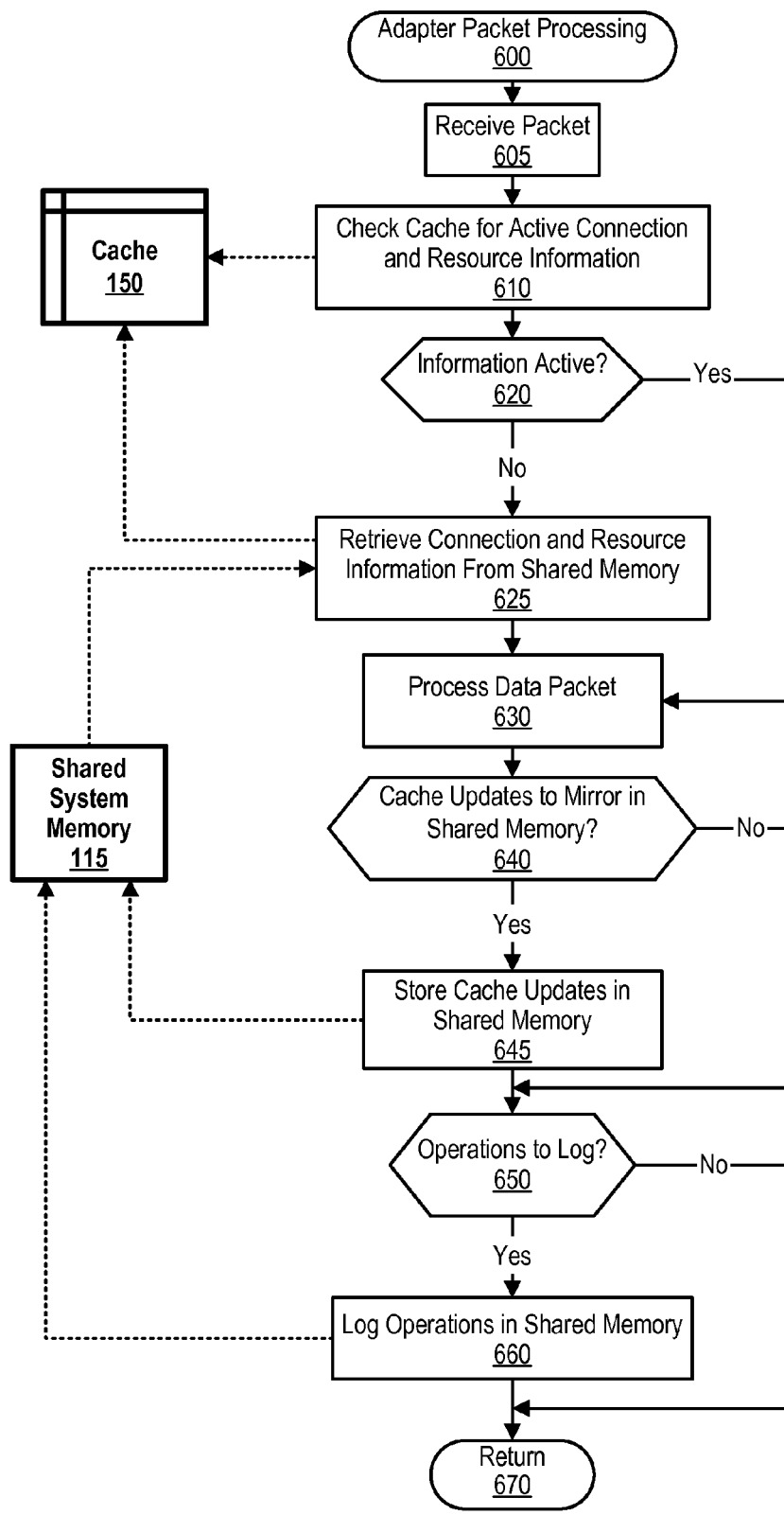
FIG. 6 is a flowchart showing steps taken in a network adapter managing offload information and logging operations information during packet processing.

FIG. 6 is a flowchart showing steps taken in a network adapter managing offload information and logging operations information during packet processing. Adapter processing commences at 600, whereupon the network adapter receives a data packet (e.g., from an application) at step 605. At step 610, the network adapter checks cache 150 to determine whether the corresponding offload information is loaded (e.g., whether the packet corresponds to an active connection or a new connection). If the offload information is not located in cache 150, decision 620 branches to the "No" branch, whereupon the network adapter retrieves the offload information from shared memory 115 and loads the offload information in cache 150 to support a newly active connection. On the other hand, if the offload information is loaded in cache 150 (e.g., already active connection), decision 620 branches to the "Yes" branch, bypassing step 625.

In one embodiment, a portion of the corresponding offload information is included in cache 150 and the remaining portion is included in shared memory 115. In this embodiment, the network adapter retrieves the remaining portion of offload data from shared memory 115 and stores it in cache 150 for quicker access.

At step 630, the network adapter processes the data packet, such as forwarding it to the correct queue pair (ingress data packet) or encapsulating the data packet and sending the data packet out a corresponding port (egress data packet).

While the network adapter processes packets or, in one embodiment, during idle states, the network adapter determines whether there are any updates made to the offload data in cache 150 that should be mirrored to the offload data stored in shared memory 115 (decision 640) (e.g., queue pair number changes, number of packets sent, etc.). The network adapter performs the mirroring operation in order for the offload information stored in shared memory 115 to be consistent with the offload information in cache 150 in case of a network adapter failure.

If there are cache updates to mirror, decision 640 branches to the "Yes" branch, whereupon the network adapter updates the offload information in shared memory 115 accordingly (step 645). On the other hand, if no mirror updates are required, decision 640 branches to the "No" branch, bypassing step 645.

The network adapter determines whether operations have been performed that should be logged (decision 650). In one embodiment, the network adapter logs the operations at a point at which the operations are performed (e.g., the number of bytes received, on which queue pair, acknowledgements, etc.). If there are operations to log, decision 650 branches to the "Yes" branch, whereupon the network adapter logs the operations in shared memory 115 accordingly (step 660). On the other hand, if no operation logs are required, decision 650 branches to the "No" branch, bypassing step 660. Processing returns at step 670.

FIG. 7 is a flowchart showing steps taken in an analysis application debugging a network adapter failure utilizing offload data and operations log data. The flowchart in FIG. 7 shows an embodiment of a device driver notifying an operating system in response to detecting an adapter failure. In a different embodiment, an analysis application may periodically "sniff" data sent from/to the network adapter in order to identify performance issues, operational issues, or error conditions.

Device driver processing commences at 700, whereupon the device driver detects a network adapter error at step 705. At step 710, the device driver notifies its operating system.

Operating system processing commences at 750, whereupon the operating system receives the adapter error notification and notifies user 765 (step 760). The operating system receives a request from user 765 to launch an analysis application at step 770. In turn, the operating system launches the analysis application, which requests the device driver to provide offload information and/or operations log information that is stored in shared system memory 115 (step 780).

At step 720, the device driver retrieves the requested information from shared system memory 115, and provides the information to the analysis application at step 730. Device driver processing ends at 740.

The analysis application receives the retrieved offload information and/or operations debug information at step 790, and works in conjunction with user 765 to debug the network adapter error utilizing the retrieved information. Processing ends at 795.

Figure 8:
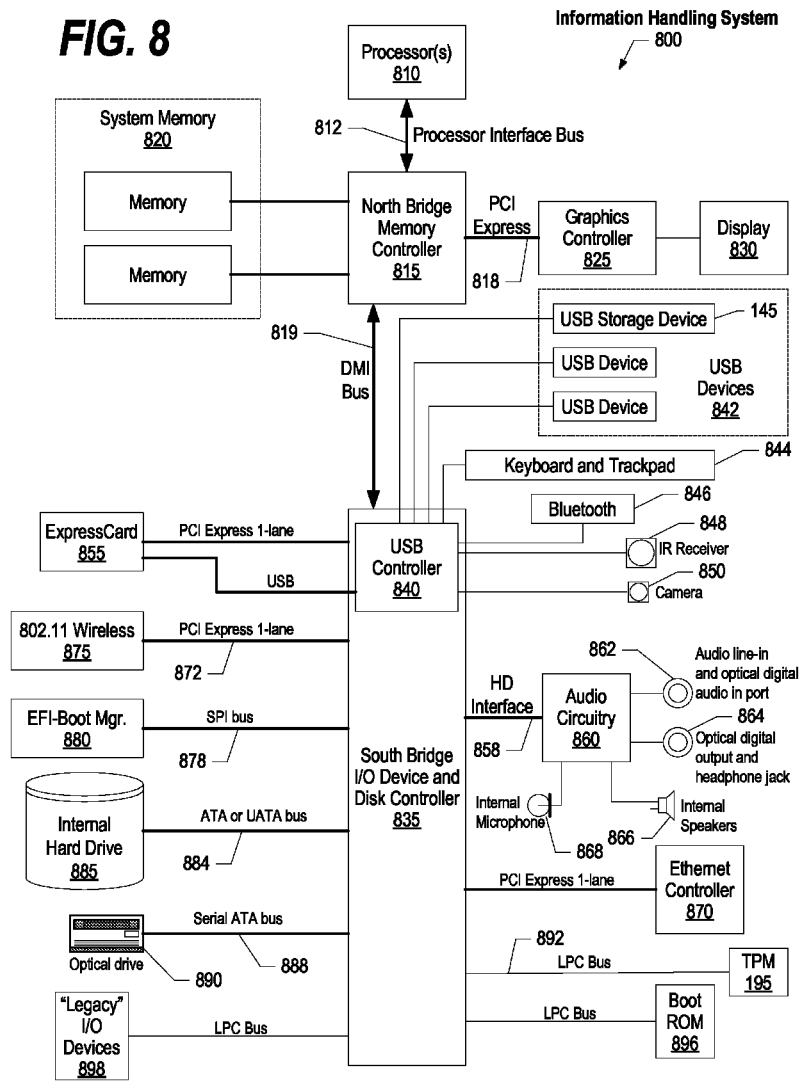
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
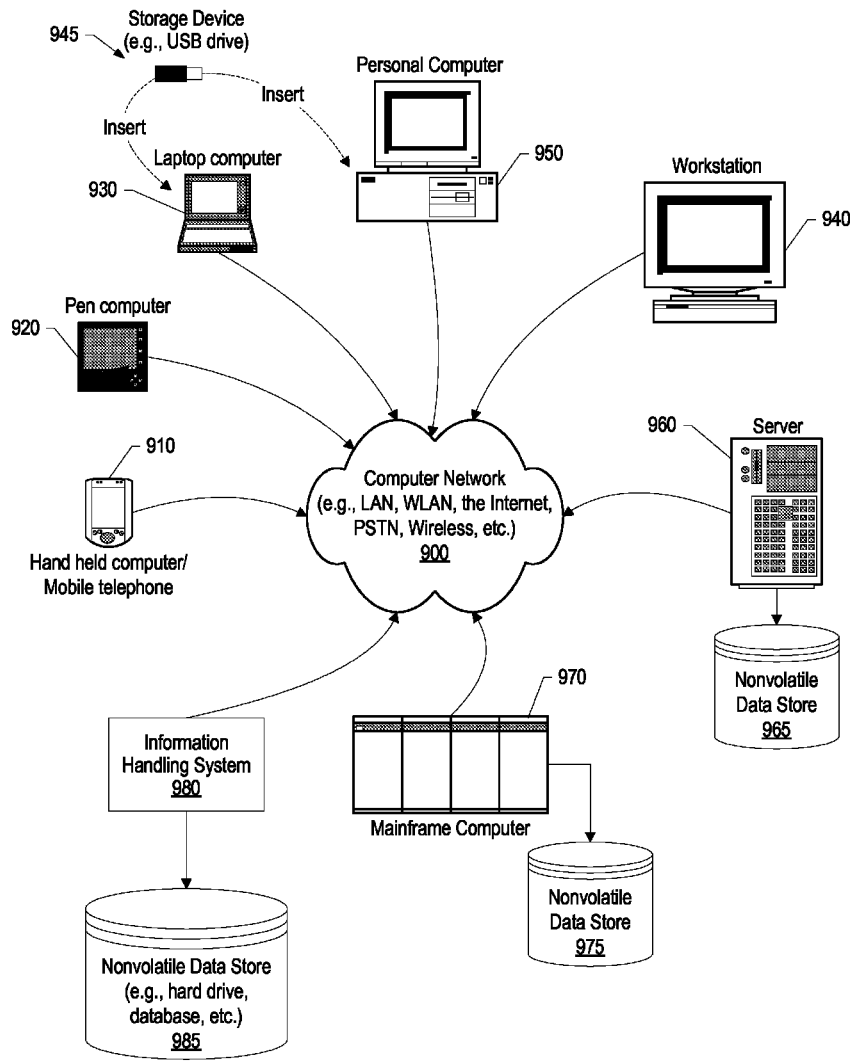
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    storing offload information, by a network hardware adapter, in shared system memory located on a host system, wherein the offload information was provided by an application and includes connection information corresponding to the application;
    detecting a network adapter error corresponding to the network hardware adapter;
    in response to detecting the network adapter error:
        retrieving the offload information stored in the shared system memory; and
        debugging the network adapter error based upon the retrieved offload information.

2. The method of claim 1 wherein the connection information includes a state of a connection corresponding to the application.

3. The method of claim 1 wherein the offload information includes resource information offloaded to the network hardware adapter by the application, the resource information including a state of one or more resources utilized to send data between the application and the network hardware adapter.

4. The method of claim 1 further comprising:
    prior to the detection of the network adapter error, the network adapter further comprises steps of:
        storing the offload information in a local cache;
        updating the offload information located in the local cache; and
        updating the offload information in the shared system memory in response to updating the offload information located in the local cache; and
    wherein the retrieved offload information is the updated offload information.

5. The method of claim 1 wherein an operating system retrieves the offload information and executes on the host system, and wherein a network device driver executing on the operating system detects the network adapter error and retrieves the offload information.

6. The method of claim 5 wherein the network adapter error is in response to the network hardware adapter becoming non-responsive to the network device driver.

7. The method of claim 5 further comprising:
    notifying, by the network device driver, the operating system of the network adapter error;
    launching, by the operating system, an analysis application in response to receiving the notification of the network adapter error;
    receiving a request at the network device driver from the analysis application to retrieve the offload information from the shared system memory; and
    sending the retrieved offload information from the network device driver to the analysis application.

8. A method comprising:
    storing offload information, by a network hardware adapter, in shared system memory located on a host system, wherein the offload information was provided by an application and includes a state of a connection corresponding to the application;
    storing, by the network hardware adapter prior to the network adapter error, operations log information in the shared system memory, wherein the operations log information identifies one or more operations performed by the network hardware adapter;
    detecting a network adapter error corresponding to the network hardware adapter;
    in response to detecting the network adapter error:
        retrieving the offload information and the operations log information stored in the shared system memory; and
        debugging, by an analysis application executing on the host system, the network adapter error based upon the retrieved offload information and the retrieved operations log information.

* * * * *